United States Patent [19]
Neuffer et al.

[11] Patent Number: 5,201,381
[45] Date of Patent: Apr. 13, 1993

[54] TRAVELING SPEED REGULATING DEVICE FOR MOTOR VEHICLES

[75] Inventors: Kurt Neuffer, Stuttgart; Jochen Boeckem, Reutlingen; Gerhard Eschrich, Tettnang, all of Fed. Rep. of Germany

[73] Assignee: Robert Bosch GmbH, Stuttgart, Fed. Rep. of Germany

[21] Appl. No.: 795,787

[22] Filed: Nov. 21, 1991

[30] Foreign Application Priority Data

Nov. 23, 1990 [DE] Fed. Rep. of Germany ....... 4037248

[51] Int. Cl.$^5$ .............................................. B60K 31/08
[52] U.S. Cl. ..................................... 180/179; 74/861; 180/170; 364/426.04
[58] Field of Search ............... 180/179, 176, 178, 177, 180/175, 170; 364/426.04; 74/861

[56] References Cited

U.S. PATENT DOCUMENTS 5,038,880  8/1991  Matsuoka et al. .................. 180/179
5,074,371 12/1991  Shibayama .......................... 180/178

FOREIGN PATENT DOCUMENTS 0222823 10/1986 Japan .................................. 180/178

Primary Examiner—David M. Mitchell
Attorney, Agent, or Firm—Michael J. Striker

[57] ABSTRACT

A traveling speed regulating device for motor vehicle provided with a drive motor and a transmission, has a transmission control for controlling the transmission, an electronic traveling speed regulator providing a nominal travelling speed, an adjusting member acting on the drive motor and changing a moment of the drive motor in dependence on a travelling speed deviation, and a further control means releasable in predetermined marginal conditions and adjusting a traveling speed by acting on the transmission control means of the transmission. The further control is designed so that a traveling speed which is over a nominal value in connection with a position of the control member which changes the moment of the motor in a zero position when the motor applies no power to wheels are provided as the marginal conditions.

8 Claims, 2 Drawing Sheets

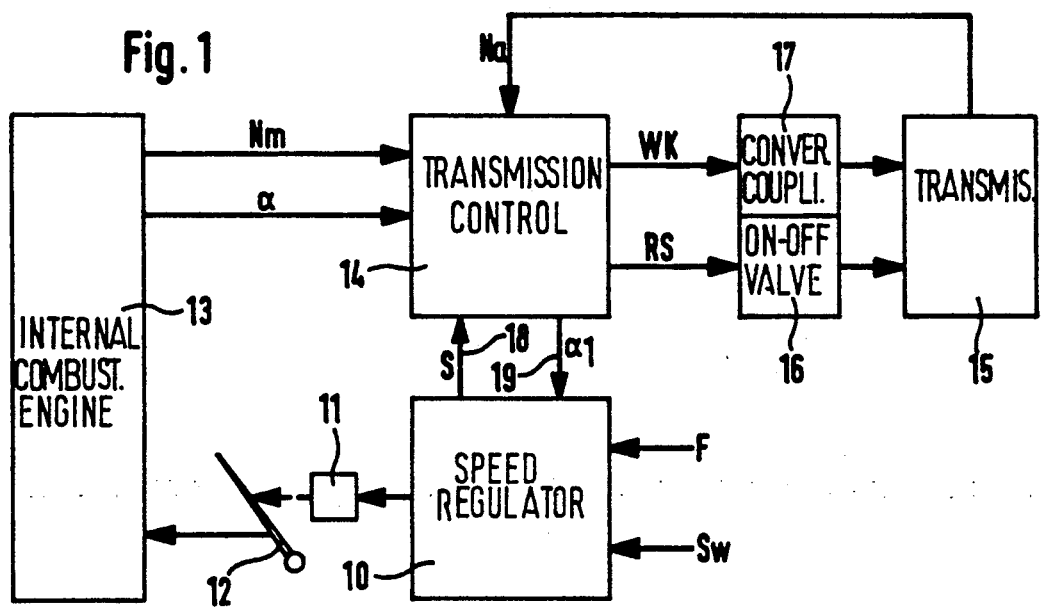
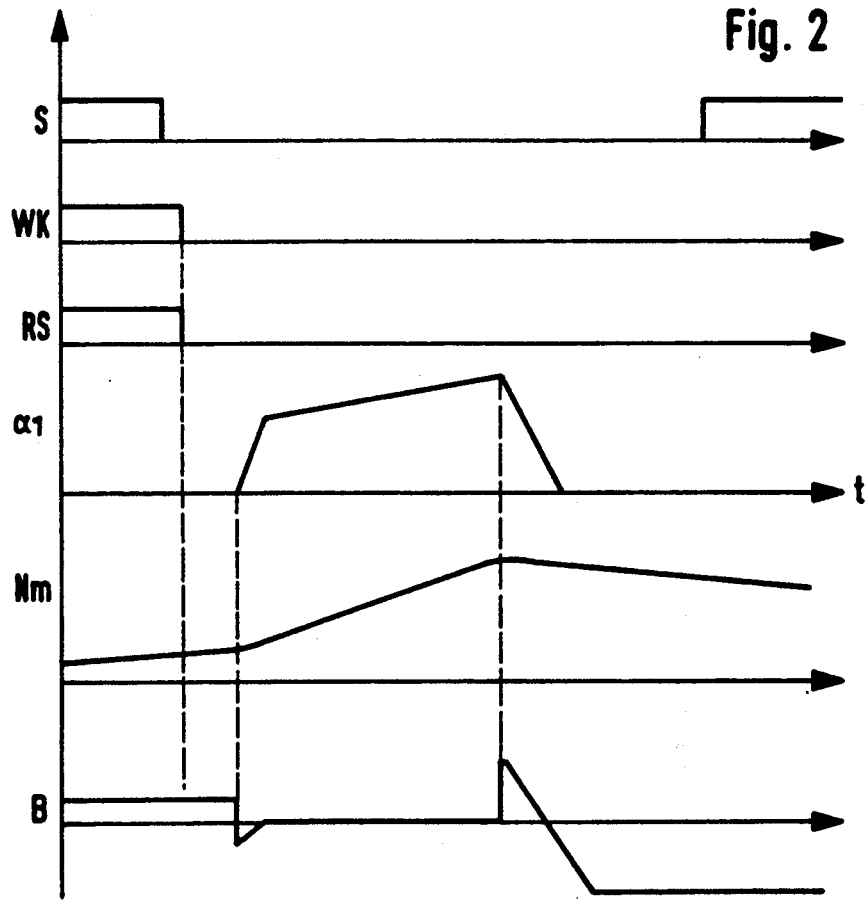

TRAVELING SPEED REGULATING DEVICE FOR MOTOR VEHICLES

BACKGROUND OF THE INVENTION

The present invention relates to a traveling speed regulating device for a motor vehicle, which has a drive motor and a transmission controlled by an electronic transmission control device.

Travelling speed regulating devices of the above mentioned general type are widely used first of all in motor vehicles of the higher class and serve for relieving the driver primarily on long trips. For this purpose a desired traveling speed is preselected, and the traveling speed regulating device regulates the traveling speed through an adjusting member in correspondence with this preset. The adjusting member engages the gas pedal, the throttle flap, the fuel injection, etc.

Some operational conditions can occur, such as for example the downhill operation during descending on an incline, during which the adjusting member due to the displacing mass is regulated back to zero-abutment, or in other words to a position in which the throttle flap is closed. Therefore the case can occur, especially with steep inclines, that the vehicle is further accelerated due to its mass and exceeds the adjusted traveling speed. With automatic transmissions, also the undersired effect can occur that the transmission, due to a high rotary speed reached, is switched to the next higher gear which leads to a further increase in the traveling speed due to the drop of a transmission braking moment. The driver is therefore forced to press on the brake or engage other measures, which often leads to a switching-off of the traveling speed regulating device. The above described situations are undesirable and influence the comfort of the traveling speed regulation.

SUMMARY OF THE INVENTION

Accordingly, it is an object of the present invention to provide a traveling speed regulating device, with which the adjusted traveling speed is automatically maintained even during downhill operation on downwardly inclined streets without any action from the driver.

In keeping with these objects and with others which will become apparent hereinafter, one feature of the present invention resides, briefly stated, in a traveling speed regulating device which is provided with additional control means which act on the traveling speed by engaging the control of the transmission and which are releasable during predetermined marginal conditions.

When the traveling speed control device is designed in accordance with the present invention, the adjusted traveling speed can be automatically maintained even during a downhill operation on downwardly inclined streets, without any attention to be paid by the driver. As a result the comfort and also the safety of the travel is significantly improved. This is especially favorable when the vehicle is heavily loaded or has a trailer. By acting on the control of the transmission, due to switching back to lower gears, the motor braking action can be increased in a stepped fashion.

As marginal conditions for activating the control of the transmission can be first of all a traveling speed which is over the nominal value in connection with a position of an adjusting member which changes the motor moment and the rotary speed in the zero position (zero load). For the action on the control of the transmission, there are principally two possibilities, namely at least a down shift to a lower transmission gear and/or the closing of a converter coupling. By a suitable selection of these possibilities the increase of the motor braking moment can be achieved in stepped fashion and thereby performed smoothly.

Especially advantageous is the means for preliminary computation of the vehicle deceleration after closing of the converter coupling and/or after the switch back. Thereby it is possible to select such a step which is directly sufficient for reduction of the traveling speed. Also, this contributes to the increase o the comfort.

A further feature for jerkless action is the transmission is embodied in that in the event of a computed traveling deceleration beyond a reset value, then action on the adjusting member with action in the control of the transmission is released, which temporarily increases a rotary speed and avoids a vehicle jerk. By this action o the adjusting member the rotary speed is adjusted so that for example a jerkless switch back is possible.

When only low vehicle deceleration is required, only a control which closes the converter coupling is released. When to the contrary the preset marginal conditions which release the action of the control of the transmission with the closed converter coupling occur, a down shift is released through a corresponding control.

For fast adjustment of the traveling speed to the present nominal value, it is advantageous to release the control which simultaneously closes the converter coupling and releases a down shift. It is released when it is shown that the preliminary computed vehicle deceleration due to the closing of the open converter coupling is too low.

For preventing the down shift due to traveling speed not adjusted after a transmission action, it is advantageous to provide, after performed transmission action, a time control which delays the testing of a further need in a transmission action.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a block diagram illustrating the action of a traveling speed regulating device on an internal combustion engine and an automatic transmission;

FIG. 2 is a signal diagram showing the processes during a transmission down shift.

DESCRIPTION OF A PREFERRED EMBODIMENT

Figure 3:
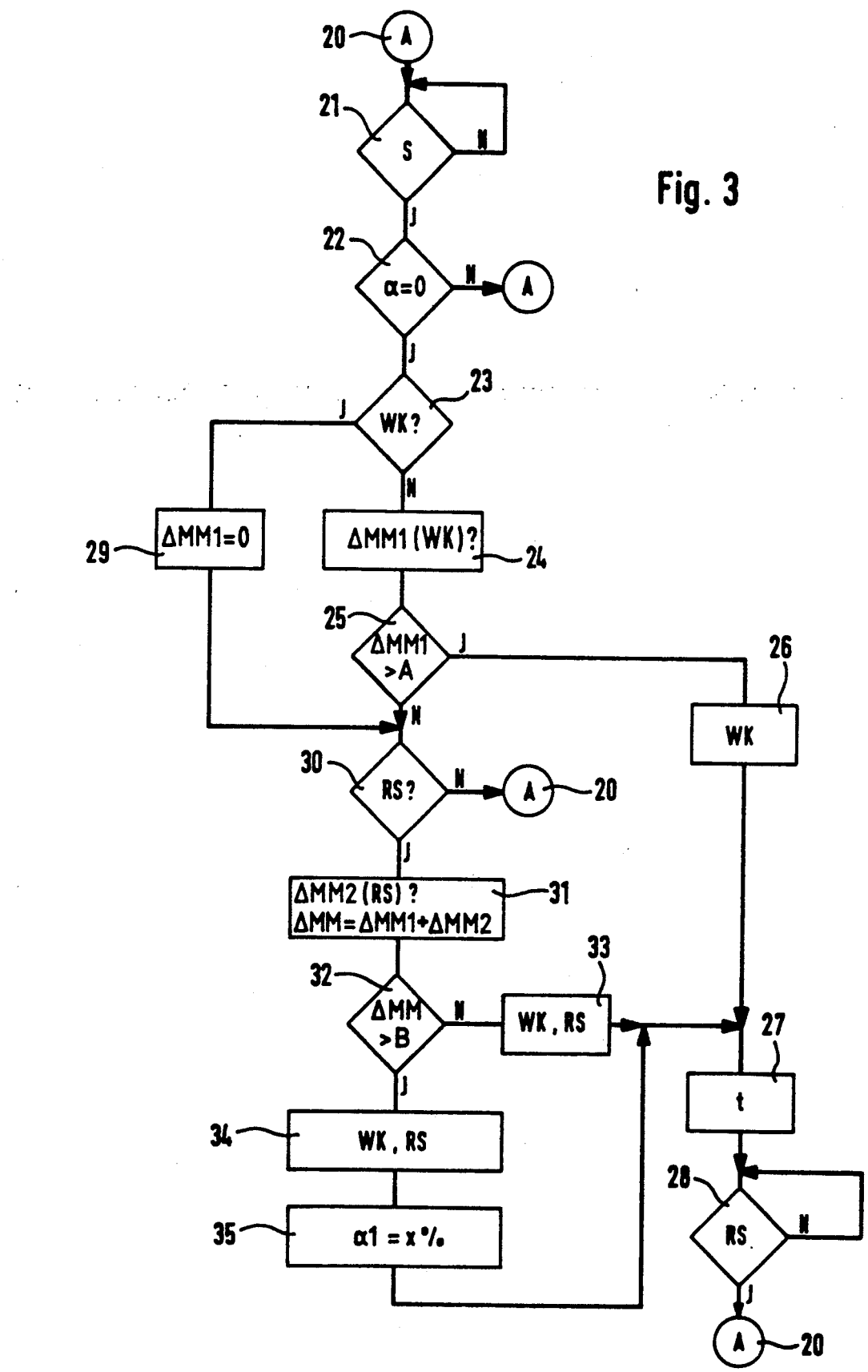
FIG. 3 is a flow diagram showing the operation of the traveling speed regulating device.

In a traveling speed regulating device for a motor vehicle in accordance with the present invention as shown in FIG. 1, a traveling speed regulator is identified with reference numeral 10. Its output acts on an adjusting member 11 which in turn acts on an adjusting element 12 for adjusting the motor moment of an internal combustion engine 13. The adjusting member 11 can be for example a stepper motor, while the adjusting element 12 can be a gas pedal, a throttle flap, a fuel injection system, etc. The traveling speed regulator 10 can be a known regulator which in a known manner acts on an internal combustion engine. An action on the adjusting element 12 is performed when the traveling speed F as an actual value deviates from a preset traveling speed nominal value.

An electronic transmission control device 14 obtains from the internal combustion engine 13 an information in the form of the rotary speed of the motor Nm or the position $a$ of the adjusting element 12, for example the throttle flap angle. Furthermore, the rotary speed of the drive Na of the driven vehicle is supplied from an automatic transmission 15. The electronic transmission control device 14 acts on the automatic transmission 15 in a known manner through an on-off valve 16 and a converter coupling 17 which overlaps the hydraulic converter in the automatic transmission. The converter coupling 17 can be dispensed with in many automatic transmissions.

The action of the traveling speed regulator 10 on the electronic transmission control device 14 is performed through a control conduit 18. A control signal S is supplied from the traveling speed regulator 10 through the control conduit 18 when the traveling speed F exceeds the nominal value Sw. A control signal $a_1$ for controlling the adjusting element 12 of the traveling speed regulator 10 can be also supplied through a further control conduit 19 from the electronic transmission control device 14.

The operation of the traveling speed regulating device of FIG. 1 is illustrated in the signal diagram of FIG. 2 and the flow diagram of FIG. 3.

The control process begins after a starting and initiating phase with a process start 20. In a next step 21 the electronic transmission control device 14 questions whether a control signal S is supplied to the control conduit 18. When this is not the case, this question is permanently repeated in a loop. In another case at step 22 it is questioned whether the adjusting element 12 is located in its zero position, or in other words, whether for example, a throttle flap angle $a=0°$. When this is not the case, a switch back to the process start 20 is performed, since in this case for reducing of the traveling speed first the adjusting element 12 and therefore the motor moment can be adjusted back or the braking moment can be increased. In another case a transition in the control process to the step 23 is performed.

In the step 23 a questioning is performed whether the converter coupling 17 is closed. When this is not the case, the differential moment $\Delta MM_1$ is computed in a computing step 24, which moment is to be expected during a switching of the converter coupling 17 as braking moment. This computation is performed with respect to the instantaneous traveling speed, rotary speed of the motor as well as the performance characteristic (characteristic diagram) of the motor and the performance characteristic (characteristic diagram) of the converter. Immediately after this in the step 25 it is questioned whether the computed differential moment $\Delta MM_1$ is greater than a preset value A. When this is true, after closing of the converter coupling 17 a sufficient braking moment is to be expected, so in the step 26 the converter coupling is closed then a dwell time t is performed through the step 26. Then in step 28 it is questioned whether a switching process is now in action. This is then expected in a loop and after this a return to the process start 20 is performed.

If in the step 23 it is determined that the converter coupling 17 is already closed, then the step 24 and the step 25 are jumped over and a differential moment $\Delta HH_1$ is set to the value zero, single in this case from the converter coupling no contribution for a braking moment can be expected any longer.

If the computed differential moment $\Delta MM_1$ is below the value A, no sufficient action on the braking moment by closing of the converter coupling 17 is to be expected or it is already closed so that the expected differential moment $\Delta MM_1$ is zero, and so a transition to step 30 is performed.

In the step 30 it is questioned whether a switch back in general is possible or in other words, whether for example the transmission is switched to the lowest gear. If such a down shift is no longer possible, a return to the process start 20 is performed. Otherwise a differential moment $\Delta MM_2$ is computed in the computing step 31 based on the same or similar parameter, which is performed during the down shift of the automatic transmission 15 to the next lower gear. The total braking moment to be expected $\Delta MM$ is then computed as the sum of $\Delta MM_1$ and $\Delta MM_2$.

In the following step 32 it is then tested whether the total braking moment to expect $\Delta MM$ is greater than a present nominal value B. If this is not the case, then in the step 33 a down shift RS of the transmission 15 to the next lower gear is activated by controlling of the corresponding switch valve 16 and it is closed by open converter coupling 17. After this a transition to the step 27 is performed and the following already described step.

If the computed braking moment $\Delta MM$ is above the nominal value B, a greater braking deceleration is to be expected, and then first in the step 34 a down shift activated and the converter coupling WK is closed. Then performed however the transition to the step 27 through the step 25.

In the step 35 a moment increased demand is performed at the side of the electronic transmission control device 14 at the traveling speed regulator 10 through the conduit 19. The corresponding signal $a_1$ acts on the adjusting member 11 and the adjusting element 12 in the sense of a smaller braking moment of the internal combustion engine 13. This moment change is used so that the additional synchronization moment of the internal combustion engine must not be applied through the drive train. A braking moment which is too strong would be disadvantageous for the traveling comfort. If at this time point $t_1$ the switching process ends or the synchronization point is achieved, then $a_1$ is again regulated back to zero (see FIG. 2). During the application of the signal $a_1$ the rotary speed of the motor Nm is smoothly increased to the synchronous rotary speed. As a result, no significant jumps are to be expected for the braking moment B which could undesirably affect the traveling comfort. The computation of the signal $a_1$ for the moment change is performed again in accordance with the known parameters and performance characteristics. From the safety reasons, the traveling speed regulator 10 accepts a signal $a_1$ only when the traveling speed regulator simultaneously senses the signal S to the electronic transmission control device 14.

Known electronic transmission control devices 14 contain usually a microcomputer for controlling the switching operations and time sequences. The process shown in FIG. 3 can perform the control process for the basic functions, so that the hardware expenses in the practice are not greater. The signal S of the conduit 15 can be a simple switching signal. It is to be understood that it can be an analog, pulse width modulated or serial signal. The signal $a_1$ at the conduit 19 can be an analog, pulse width modulated or serial signal.

It is to be understood that the above described control process can be performed also in a separate control device or in the traveling speed regulator.

The invention is not limited to an action on the transmission in the downhill operation to activate a switch back. The traveling speed regulator can also act in a different way during the process of the transmission control, in order to increase the traveling comfort under special conditions. For example, in the case of specific demands of the traveling speed regulator an action in the transmission control is performed, for example, a switching over to another parameter characteristic is performed. For example, during a strong increase in the traveling speed—nominal value, a switch back in the transmission is released, for achieving the new nominal value faster.

The present invention is also not limited to the utilized for the internal combustion engines, but also can be used for other drive motors, such as for example, electric motors, and can be used when they are driven through an automatic transmission in a motor vehicle.

It will be understood that each of the elements described above, or two or more together, may also find a useful application in other types of constructions differing from the types described above.

While the invention has been illustrated and described as embodied in a traveling speed regulating device for a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A traveling speed regulating device for motor vehicle provided with a drive motor and a transmission, the device comprising transmission control means for controlling said transmission; an electronic traveling speed regulator providing a nominal travelling speed; an adjusting member acting on the drive motor and changing a moment of the drive motor in dependence on a travelling speed deviation; and further control means releasable in predetermined marginal conditions and adjusting a traveling speed by acting on said transmission control means of the transmission, said further control means being designed so that a traveling speed which is over a nominal value in connection with a position of said control member which changes the moment of the motor in a zero position when the motor applies no power to wheels are provided as the marginal conditions.

2. A traveling speed regulating device as defined in claim 1; and further comprising a converter coupling, the action on the control of the transmission being releasable one of as a down shift to a lower transmission gear and a closing of said converter coupling.

3. A traveling speed regulating device as defined in claim 2; and further comprising means for preliminary computation of the vehicle deceleration after at least one of a closing of said converter coupling and after a down shift.

4. A traveling speed regulating device as defined in claim 3, wherein at least when the computed vehicle acceleration is over a predetermined value, said adjusting member during action of the control of the transmission increases the moment of the motor and avoids a vehicle jerk.

5. A traveling speed regulating device as defined in claim 2, wherein when a vehicle deceleration is to be reduced only a control which closes said converter coupling is provided.

6. A traveling speed regulating device as defined in claim 2, wherein when the converter coupling is closed, at least a down shift is released.

7. A traveling speed regulating device as defined in claim 3, wherein during closing of the open converter coupling with too low computed vehicle acceleration substantially simultaneously said converter coupling is closed and a down shift is released.

8. A traveling speed regulating device as defined in claim 2, wherein after the action of the transmission a time control which delays a further action on the transmission is performed to test whether the further action is required.

* * * * *